(12) United States Patent
Kim et al.

(10) Patent No.: US 9,782,050 B2
(45) Date of Patent: Oct. 10, 2017

(54) ROBOT CLEANER AND METHOD FOR CONTROLLING THE SAME

(71) Applicant: LG ELECTRONICS INC., Seoul (KR)

(72) Inventors: Bongju Kim, Seoul (KR); Sunghun Lee, Seoul (KR); Ilsoo Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/733,604

(22) Filed: Jun. 8, 2015

(65) Prior Publication Data

US 2016/0022107 A1   Jan. 28, 2016

(30) Foreign Application Priority Data

Jul. 23, 2014   (KR) .................. 10-2014-0093124

(51) Int. Cl.
*A47L 11/40* (2006.01)
*G06K 9/00* (2006.01)
*G06K 9/20* (2006.01)
*G05D 1/00* (2006.01)
(Continued)

(52) U.S. Cl.
CPC ........ *A47L 11/4011* (2013.01); *G05D 1/0094* (2013.01); *G06K 9/00664* (2013.01); *G06K 9/00805* (2013.01); *G06K 9/2054* (2013.01); *G06T 7/97* (2017.01); *A47L 2201/022* (2013.01); *A47L 2201/04* (2013.01); *A47L 2201/06* (2013.01); *G05D 2201/0203* (2013.01);
(Continued)

(58) Field of Classification Search
CPC ............ A47L 11/4011; A47L 2201/06; A47L 2201/04; A47L 2201/022; G06T 7/0022; G06T 2207/30261; G06K 9/2054; G06K 9/00805; G06K 9/00664; G05D 1/0246; G05D 1/0274; G08B 13/1966; Y10S 901/01
See application file for complete search history.

(56) References Cited

U.S. PATENT DOCUMENTS

| | | | | |
|---|---|---|---|---|
| 4,821,192 A | * | 4/1989 | Taivalkoski | ........... B25J 9/0003 700/258 |
| 5,446,445 A | * | 8/1995 | Bloomfield | ............ G08B 17/10 340/521 |

(Continued)

FOREIGN PATENT DOCUMENTS

| | | |
|---|---|---|
| CN | 1381339 A | 11/2002 |
| CN | 1401292 A | 3/2003 |

(Continued)

*Primary Examiner* — Stephen Holwerda
(74) *Attorney, Agent, or Firm* — Dentons US LLP

(57) ABSTRACT

A method of controlling a robot cleaner includes recognizing information on a monitoring standby position by a robot cleaner, moving to the monitoring standby position at a monitoring start time by the robot cleaner, acquiring an image, by an image acquisition unit of the robot cleaner, at the monitoring standby position, determining whether an event has occurred, by the robot cleaner, based on the image acquired by the image acquisition unit, transmitting the image acquired by the image acquisition unit to an external remote terminal when it is determined that the event occurred.

16 Claims, 9 Drawing Sheets

(51) Int. Cl.
*G06T 7/00* (2017.01)
*G08B 13/196* (2006.01)

(52) U.S. Cl.
CPC ............... *G06T 2207/30261* (2013.01); *G08B 13/1966* (2013.01); *Y10S 901/01* (2013.01)

(56) References Cited

U.S. PATENT DOCUMENTS

| | | | |
|---|---|---|---|
| 2003/0229474 A1* | 12/2003 | Suzuki | G08B 25/009 702/188 |
| 2004/0088080 A1* | 5/2004 | Song | A47L 9/009 700/259 |
| 2004/0113777 A1* | 6/2004 | Matsuhira | G08B 13/19645 340/541 |
| 2004/0158357 A1 | 8/2004 | Lee et al. | |
| 2004/0178767 A1* | 9/2004 | Jeon | A47L 9/009 320/114 |
| 2005/0096790 A1* | 5/2005 | Tamura | G06N 3/008 700/245 |
| 2005/0120505 A1* | 6/2005 | Tani | G08B 13/19658 15/319 |
| 2005/0237188 A1 | 10/2005 | Tani | |
| 2005/0237189 A1* | 10/2005 | Tani | G05D 1/0246 340/541 |
| 2006/0060216 A1* | 3/2006 | Woo | A47L 9/0009 134/18 |
| 2006/0061657 A1* | 3/2006 | Rew | H04N 7/181 348/151 |
| 2013/0056032 A1 | 3/2013 | Choe et al. | |
| 2013/0060379 A1 | 3/2013 | Choe et al. | |

FOREIGN PATENT DOCUMENTS

| | | |
|---|---|---|
| CN | 1493246 A | 5/2004 |
| CN | 1493434 A | 5/2004 |
| CN | 1530781 A | 9/2004 |
| CN | 1753491 A | 3/2006 |
| CN | 103479303 A | 1/2014 |
| EP | 1553536 A1 | 7/2005 |
| EP | 2363774 A1 | 9/2011 |
| EP | 2381328 A2 | 10/2011 |
| JP | 2002-92761 A | 3/2002 |
| JP | 2005-275899 A | 10/2005 |
| JP | 2006134218 A | 5/2006 |
| KR | 20060028293 A | 3/2006 |
| KR | 10-2013-0103204 A | 9/2013 |
| WO | 2012157951 A2 | 11/2012 |

* cited by examiner

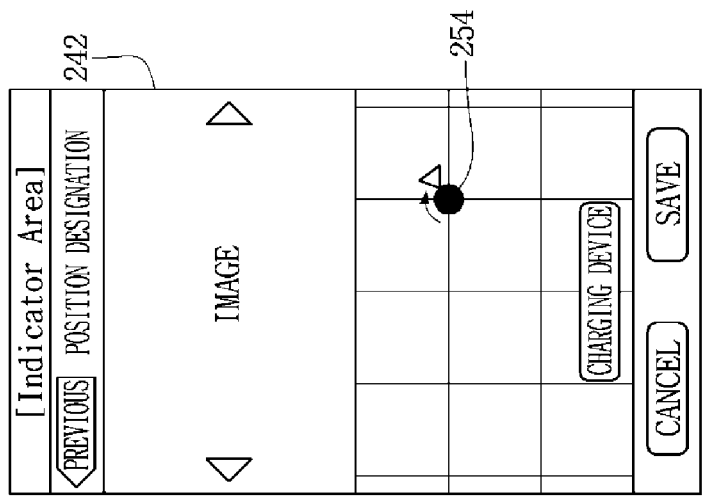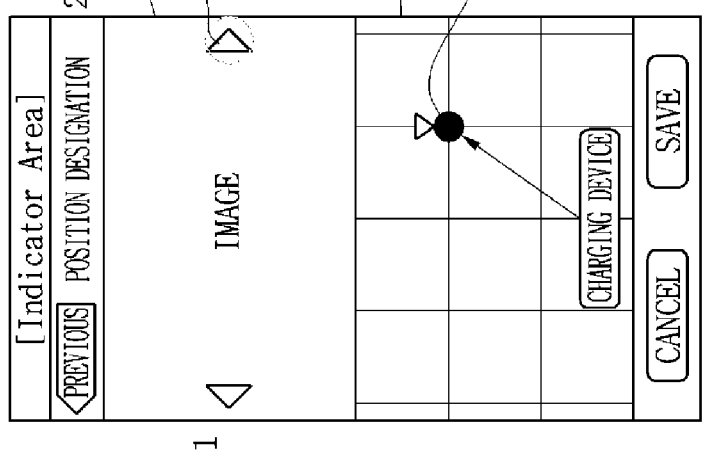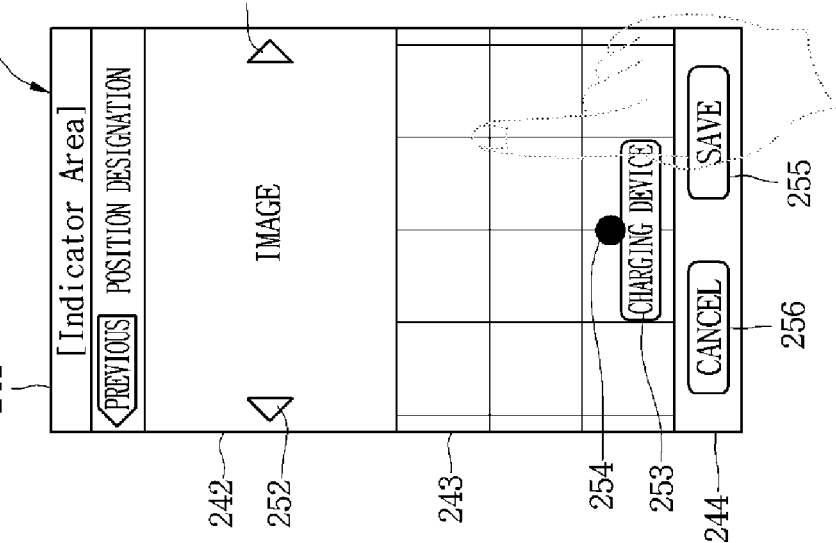

ROBOT CLEANER AND METHOD FOR CONTROLLING THE SAME

CROSS-REFERENCE TO RELATED APPLICATIONS

The present application claims priority under 35 U.S.C. 119 and 35 U.S.C. 365 to Korean Patent Application No. 10-2014-0093124 (filed on Jul. 23, 2014), which is incorporated by reference in its entirety for all purposes as if fully set forth herein.

BACKGROUND

The present disclosure relates to a robot cleaner and a method for controlling the same.

Typically a robot cleaner refers to a device automatically cleaning an area desired to clean without user manipulation by autonomously running and sucking foreign materials including dust from a floor surface within the area.

As prior art literature, Korean patent application laid-open publication No. 10-2006-0028293 (publication date: Mar. 29, 2006) discloses an intrusion detection system and method using a robot cleaner.

In the prior art literature, a robot cleaner and a separate detection unit are installed in an area considered as a dangerous area, and in a case where the detection unit detects an intruder, the robot cleaner receives a detected signal and captures an image by using a camera.

However, in the prior art literature, since an intruder is detected by using the robot cleaner and the separate detection unit, the robot cleaner requires to be equipped with a separate infrared transceiver. Accordingly, the robot cleaner becomes expensive and a structure for installing the infrared transceiver becomes complex.

In addition, since the robot cleaner is required to be at a position where an infrared ray may be transmitted and received to and from the detection unit, the position of the robot cleaner is restrictive. Furthermore, when a position of the detection unit is changed by an external force, communication between the detection unit and robot cleaner becomes disabled.

SUMMARY

Embodiments provide a robot cleaner capable of monitoring the inside of a home or a building and transmitting an image of the inside of the home or building to a remote terminal at the time of an event occurrence.

In one embodiment, a method for controlling a robot cleaner includes: recognizing information on a monitoring standby position by the robot cleaner; moving to the monitoring standby position at a monitoring start time by the robot cleaner; acquiring an image, by an image acquisition unit of the robot cleaner, at the monitoring standby position; determining whether an event has occurred, by the robot cleaner, based on the image acquired by the image acquisition unit; transmitting the image acquired by the image acquisition unit to an external remote terminal when it is determined that the event has occurred.

In another embodiment, a robot cleaner includes: a robot cleaner main body; an image acquisition unit in the robot cleaner main body; a cleaner communication unit in the robot cleaner main body and communicating with an external remote terminal; a cleaner memory storing an image acquired by the image acquisition unit; and a cleaner controller determining whether an event has occurred based on the image acquired by the image acquisition unit, wherein the cleaner controller recognizes a monitoring start time and then directs the robot cleaner main body to move to a monitoring standby position when a current time reaches a monitoring start time, determines whether the event has occurred based on the image acquired by the image acquisition unit at the monitoring standby position, and controls the cleaner communication unit to transmit an image stored in the cleaner memory to the remote terminal when it is determined that the event has occurred.

In further another embodiment, a method for controlling a robot cleaner includes: recognizing information on a monitoring standby position by a robot cleaner; determining whether a movement condition that the robot cleaner moves to the monitoring standby position is satisfied; moving to the monitoring standby position when the movement condition is satisfied; acquiring an image, by an image acquisition unit of the robot cleaner, at the monitoring standby position; determining whether an event has occurred, by the robot cleaner, based on the image acquired by the image acquisition unit; and transmitting to an external remote terminal the image acquired by the image acquisition unit when it is determined that the event has occurred.

The details of one or more embodiments are set forth in the accompanying drawings and the description below. Other features will be apparent from the description and drawings, and from the claims.

BRIEF DESCRIPTION OF THE DRAWINGS

FIGS. 6A to 6C are views illustrating monitoring standby position determination screens displayed on a user interface of a remote terminal according to an embodiment.

DETAILED DESCRIPTION OF THE EMBODIMENTS

Reference will now be made in detail to the embodiments of the present disclosure, examples of which are illustrated in the accompanying drawings.

In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense.

Also, in the description of embodiments, terms such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, the former may be directly "connected," "coupled," and "joined" to the latter or "connected", "coupled", and "joined" to the latter via another component.

Figure 1:
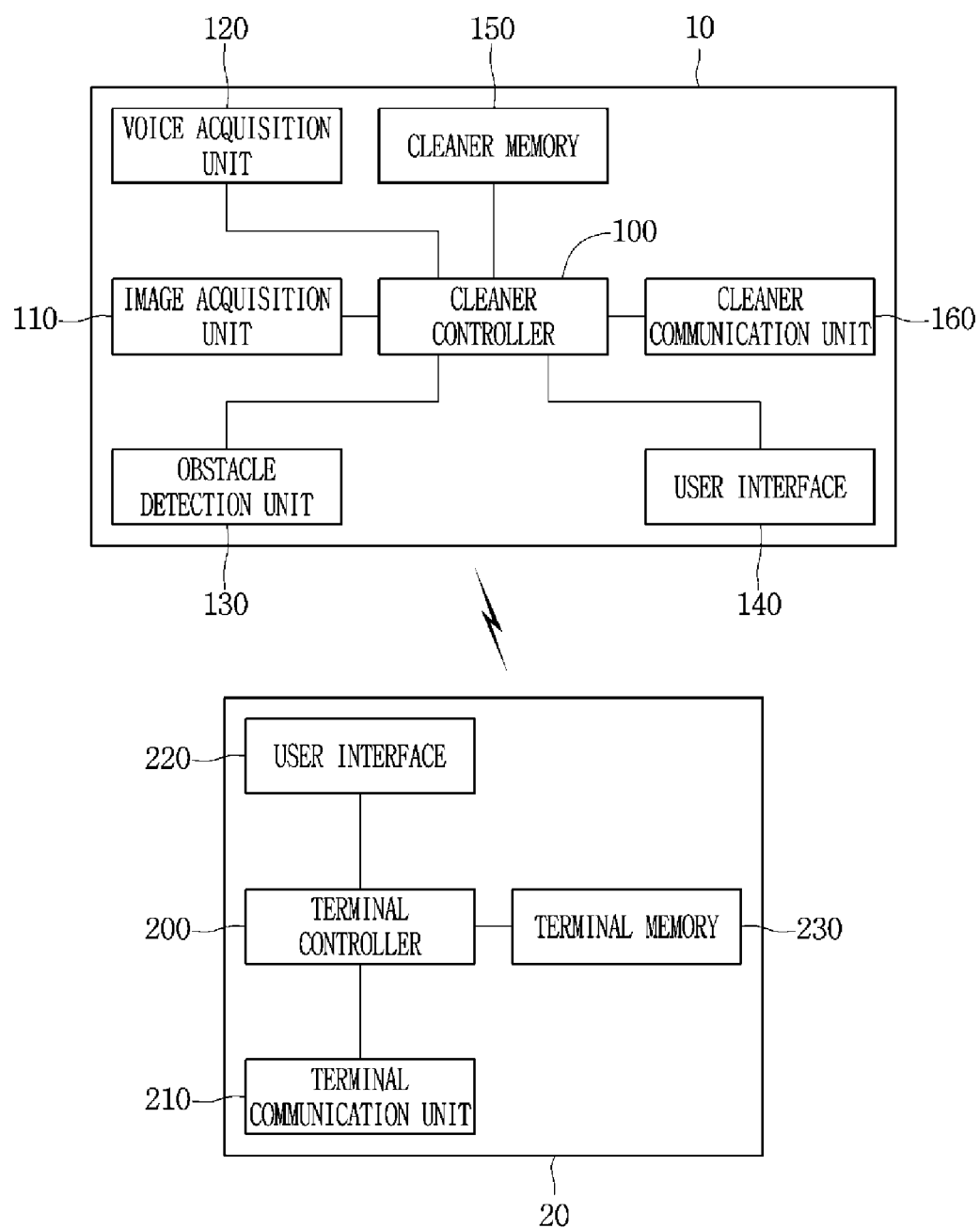
FIG. 1 is a block diagram schematically illustrating a robot cleaner and a remote terminal capable of communicating with the robot cleaner according to an embodiment.

FIG. 1 is a block diagram schematically illustrating a robot cleaner and a remote terminal capable of communicating with the robot cleaner according to an embodiment.

Referring to FIG. 1, a robot cleaner 10 according to an embodiment may include an image acquisition unit 110. One or more image acquisition units 110 may be included in the robot cleaner 10.

One image acquisition unit 110 may be installed in the top portion or a side portion of a main body of the robot cleaner 10. Alternatively, one or more image acquisition units 110 may be installed in the top portion of the main body of the robot cleaner 10 and one or more image acquisition units 110 may be installed in a side portion of the main body of the robot cleaner 10.

The image acquisition unit 110 may acquire images around the robot cleaner 10. The image acquisition unit 110 may be a camera, as an example, and include a wide-angle lens of which an image acquirable range is wide. The image acquisition unit 110 may rotate horizontally or vertically by a moving device in the robot cleaner 10.

A map of a space in which the robot cleaner 10 is positioned is drawn or an image of a specific area inside a home or building may be acquired in a monitoring mode by using the image acquisition unit 110.

The robot cleaner 10 may further include an obstacle detection unit 130. The obstacle detection unit 130 may detect an obstacle when the robot cleaner 10 moves, and when the obstacle detecting unit 130 detects the obstacle, the robot cleaner 10 may move to avoid the obstacle. Since the obstacle detection unit 130 may be implemented with a known structure, a detailed description thereabout will be omitted herein.

The robot cleaner 10 may further include a user interface 140. The user interface 140 may include a display unit displaying various pieces of information and an input unit through which various commands may be input.

As an example, one of a running mode, cleaning reservation, cleaning time, map drawing, monitoring time setting, and monitoring standby position determination may be input by using the user interface 140. The robot cleaner 10 may also receive various cleaning related commands or monitoring commands from the remote terminal 20.

The robot cleaner 10 may further include a cleaner communication unit 160. The cleaner communication unit 160 may transmit and/or receive various pieces of information through communication with the remote terminal 20. A communication scheme of the cleaner communication unit 160 is not limited as long as the cleaner communication unit 160 may communicate with the remoter terminal 20. However, the cleaner communication unit 160 may wirelessly communicate with the remote terminal 20 and include a communication module having an identical communication scheme to that of the remoter terminal 20.

The robot cleaner 10 may further include a cleaner memory 150. The cleaner memory 150 may store information on an operation state of the robot cleaner 10. For example, at the time of cleaning by using the robot cleaner 10, information on a cleaning history may be stored. The cleaning history may include one of a cleaning distance, cleaning area, and cleaning time.

The cleaner memory 150 may also store preset map information.

In addition, the cleaner memory 150 may additionally store image information acquired by the image acquisition unit 110. The image information stored in the cleaner memory 150 may be transmitted to the remote terminal 20 by the cleaner communication unit 160.

In addition, the cleaner memory 150 may store a determined monitoring standby position.

The robot cleaner 10 may further include a voice acquisition unit 120. The voice acquisition unit 120 may receive a user voice or other sounds. When information acquired by the voice acquisition unit 120 is a user command, the cleaner controller 100 may direct the robot cleaner 10 to execute a function corresponding thereto.

The cleaner controller 100 may determine that an event has occurred in a monitoring mode, when the information acquired by the voice acquisition unit 120 is not a user command. The event may be a case when a voice or sound occurs by an intruder voice or an external shock, not by a user command, in the monitoring mode. A case when the event occurs may be, for example, a case when a sound occurs by an opened door of a home or building, by a dropped object in a home or building, or by a shocked object.

The cleaner controller 100 may control the robot cleaner 10 to be operated in a cleaning mode or monitoring mode. In the cleaning mode, the cleaner controller 100 may allow the robot cleaner 10 to run and clean a cleaning target area in a set running mode. In the monitoring mode, the cleaner controller 100 may control the robot cleaner 10 to move to a monitoring standby position and the image acquisition unit 110 to acquire an image of a specific area. In addition, in the monitoring mode, the cleaner controller 100 may analyze image information acquired by the image acquisition unit 110 to determine whether an event has occurred. As an example, when there is a difference between images acquired at a time interval, the cleaner controller 100 may determine that the event occurred.

In detail, the cleaner controller 100 divides each of the acquired images into a plurality of pixels, compares pixels of a current image and previous image, and when at least a predetermined number of pixels are different, an event is determined to have occurred.

In addition, when the event is determined to have occurred, the cleaner controller 100 may direct the cleaner communication unit 160 to transmit one or more images among a plurality of images related to the event that are stored in the cleaner memory 150 to the remote terminal. At this point, after the event is determined to have occurred, the image acquisition unit 110 may additionally acquire images after a predetermined time is elapsed. In addition, the cleaner communication unit 160 may transmit to the remote terminal 20 one or more images after the event occurrence including an image (i.e., an image having a difference with a previous image) used for determination of the event occurrence. As an example, the cleaner communication unit 160 may transmit a plurality of images after the event occurrence to the remote terminal 20.

Alternatively, the cleaner communication unit 160 may transmit to the remote terminal 20 an image used for determining the event occurrence, one or more images acquired previously before the image used for determining the event occurrence, and one or more images acquired after the event occurrence.

Alternatively, when the event is determined to have occurred, the image acquisition unit 110 acquires a video and the cleaner communication unit 160 may transmit the video acquired after a time point of the event occurrence to the remote terminal 20.

Although not illustrated in the drawing, the robot cleaner 10 may further include a cleaning device for cleaning execution and a moving device for running. The cleaning device may include a suction motor and dust bin, and the moving device may include a plurality of wheels and a plurality of motors for driving each of the plurality of wheels.

Furthermore, the remote terminal 20 may include a terminal controller 200 and a terminal communication unit 210 capable of communicating with the cleaner communication unit 160.

In addition, the remote terminal 20 may further include a terminal memory 230 for storing various pieces of information and images transmitted from the robot cleaner 10.

The remote terminal 20 may further include a user interface 220 for information input and information display. Through the user interface 220, at least one of a cleaning command, monitoring mode command, and monitoring standby position setting command of the robot cleaner 10 may be input. In addition, through the user interface 220, a cleaning completion area by the robot cleaner 10 or an image transmitted by the robot cleaner 10 may be checked.

Hereinafter, a control method of the robot cleaner will be described. As a control method of the robot cleaner, description will be provided about an operation of the robot cleaner in a monitoring mode of the robot cleaner.

Figure 2:
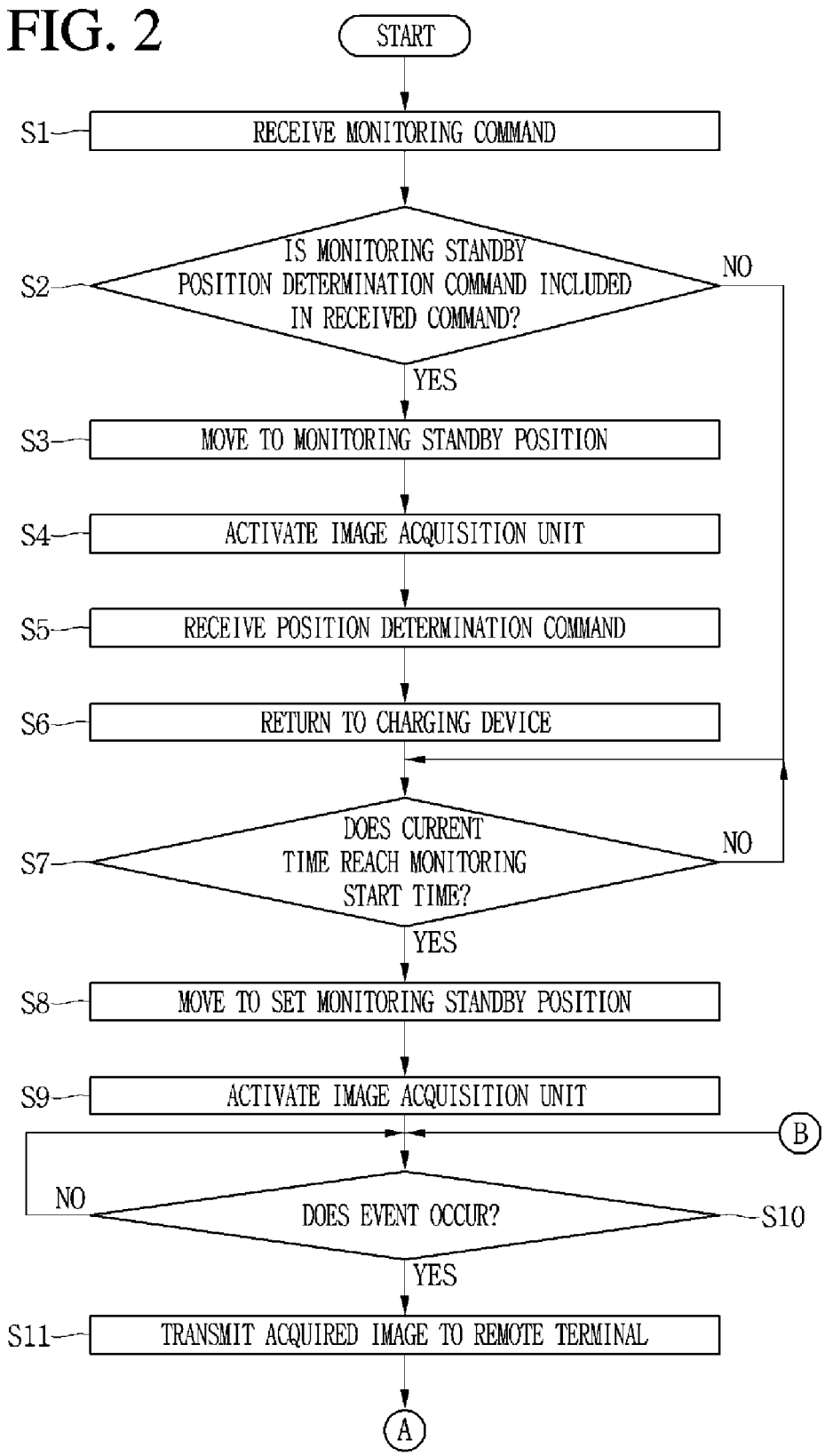
FIGS. 2 and 3 are flowcharts for explaining a method of controlling a robot cleaner according to an embodiment.
Figure 3:
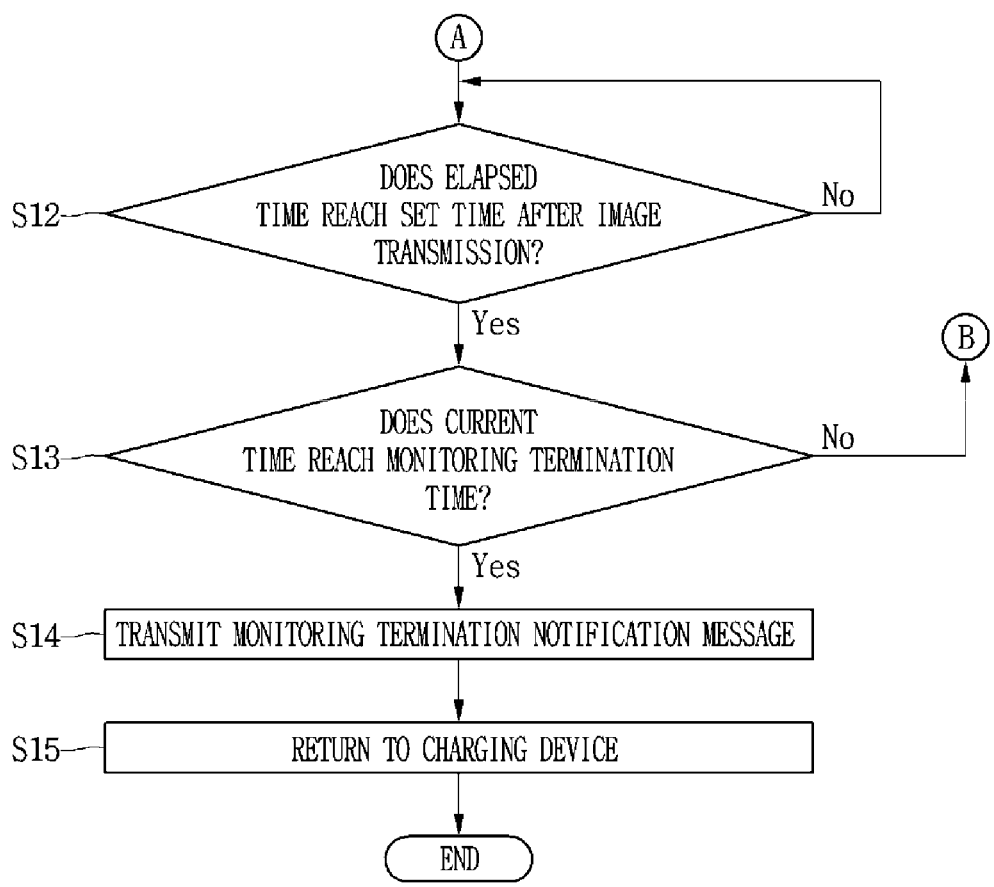
Figure 4:
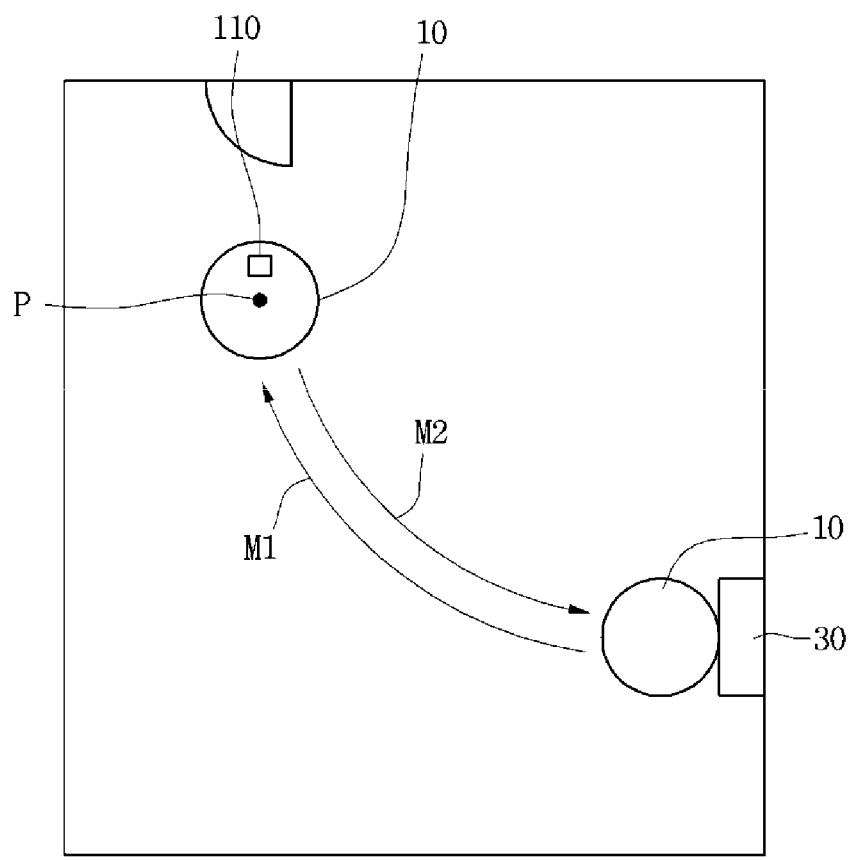
FIG. 4 is a view illustrating a robot cleaner moving to a monitoring standby position and then returning to a charging device.
Figure 5A:
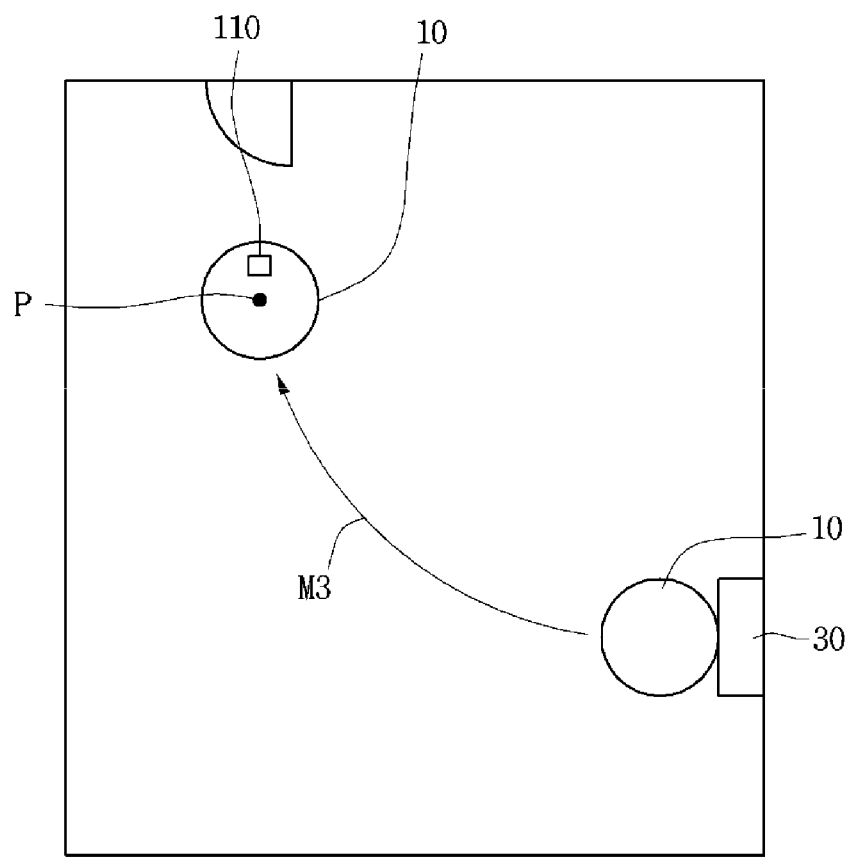
FIGS. 5A and 5B are views illustrating a robot cleaner standing by at a monitoring standby position.
Figure 5B:
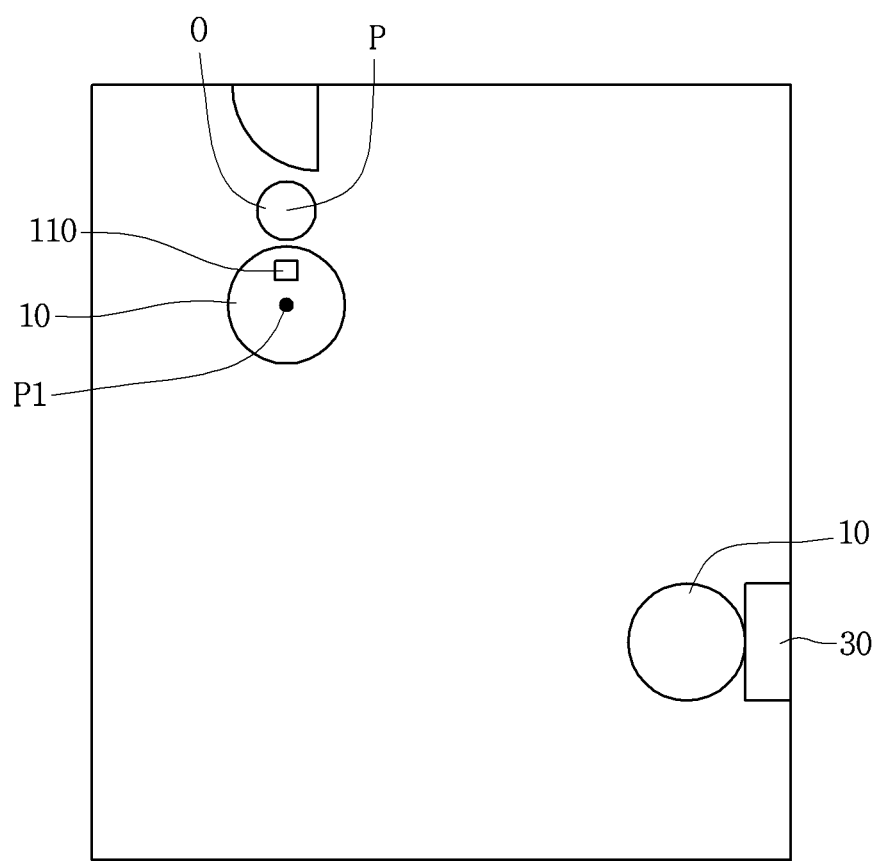

FIGS. 2 and 3 are flowcharts for explaining a control method of a robot cleaner according to an embodiment, FIG. 4 is a view illustrating a robot cleaner moving to a monitoring standby position and then returning to a charging device, and FIGS. 5A and 5B are views illustrating a robot cleaner standing by at the monitoring standby position.

FIG. 5A illustrates that a robot cleaner is positioned at a monitoring standby position, and FIG. 5B illustrates that when there is an obstacle at the monitoring standby position, a robot cleaner is positioned at a monitoring standby position changed to avoid the obstacle.

Referring to FIGS. 2 to 5, the robot cleaner 10 may receive a monitoring command from the remote terminal 20 (operation S1). When the robot cleaner 10 receives the monitoring command from the remote terminal 20, the robot cleaner 10 may recognize information on the monitoring standby position. The operation of recognizing information on the monitoring standby position may include operations S2 to S6 to be described below.

Alternatively, the monitoring command may be input through the user interface 140. As an example, the robot cleaner 10 may receive the monitoring command in a state of being docked to a charging device 30, or in a position separated from the charging device 30.

Hereinafter, a description will be provided using an example that the robot cleaner 10 receives the monitoring command in a state of being docked to the charging device 30.

The monitoring command may include a monitoring start time. In addition, the monitoring command may include a monitoring termination time or a monitoring period. At this point, the monitoring start time may be a current time or a future time. As an example, when the monitoring command includes a monitoring start time and monitoring termination time, the robot cleaner may operate in a monitoring mode at the monitoring start time and release the monitoring mode at the monitoring termination time. When the monitoring command includes the monitoring start time and monitoring termination time, the robot cleaner may operate in a monitoring mode at the monitoring start time and release the monitoring mode when a monitoring period is expired.

In an embodiment, the cleaner controller 100 may recognize a current time for checking that the current time reaches the monitoring start time. At this point, the cleaner controller 100 may recognize the current time by a self-employed program or receive the current time from the outside.

In addition, the monitoring command may include a monitoring standby position determination command. The cleaner controller 100 determines whether the received monitoring command includes the monitoring standby position determination command (operation S2). For example, when the monitoring standby position is not determined before reception of the monitoring command, the monitoring command may include the monitoring standby position determination command. As a determination result in operation S2, when the received monitoring command includes the monitoring standby position determination command, the robot cleaner 10 moves to the received monitoring standby position P (operation S3) (See an arrow M1). The monitoring standby position P may be set by the remote terminal 20, and the monitoring command may include the monitoring standby position P. The monitoring standby position P is not limited, but may be adjacent to a door that a human travels through or a window. Typically, an external intruder may enter the inside through a window or door and the monitoring standby position P may be designated as a position that is adjacent to the window or door for monitoring for an external intruder. However, since the monitoring standby position P is a position designated by a user, a user may set any one point among various points as the monitoring standby position P. The robot cleaner 20 moves to the monitoring standby position P and then the image acquisition unit 110 may be activated (operation S4). When the image acquisition unit 110 is activated, the image acquisition unit 110 may acquire surrounding images and the acquired images may be transmitted to the remote terminal 20.

The user interface 220 of the remote terminal 20 may display the images transmitted by the robot cleaner 10. In addition, the user checks the images displayed on the user interface 220, and then may change a position of the robot cleaner 10, rotates the robot cleaner 10, or determine a current position of the robot cleaner 10 as the monitoring standby position P. For example, when the image displayed on the user interface 220 does not include the entire door or window, the user may input a backward command of the robot cleaner 10 through the user interface 220.

Alternatively, when the door and window on the image displayed on the user interface 220 looks small, the user may input a forward command of the robot cleaner 10 through the user interface 220.

Alternatively, when only a part of the door or window is shown on the image displayed on the user interface 220, the user may input a rotation command of the robot cleaner 10 through the user interface 220.

However, since the robot cleaner 10 may recognize a current position of itself by using a gyro sensor, when the robot cleaner 10 is unnecessarily rotated, a position recognition error of the robot cleaner 10 may occur by an error of the gyro sensor. Accordingly, the robot cleaner 10 may rotate within 180 degrees in one direction. For example, when an additional rotation command is input in a first direction by an input of a rotation command from the user interface 220 in a state where the robot cleaner 10 rotates by 180 degrees in the first direction, the robot cleaner 10 may first return to an initial state by rotating by 180 degrees in a second direction that is opposite to the first direction, and then rotate in the second direction on the basis of the additional rotation command. In the present embodiment, the reason why the robot cleaner 10 first rotates by 180 degrees in the second direction that is opposite to the first direction is to minimize an error of the gyro sensor by allowing a position sensed by the gyro sensor to be changed to a position before the direction change, the gyro sensor value to be changed to the initial value, and the robot sensor 10 to be additionally rotated in the second direction.

The robot cleaner 10 may receive a determination command of the monitoring standby position P from the remote terminal 20 (operation S5).

Then the robot cleaner 10 may return to the charging device 30 (operation S6) (See an arrow M2). In the present embodiment, the reason why the robot cleaner 10 returns to the charging device 30 after the monitoring standby position is determined is to allow the battery charge of the robot cleaner to be increased before performing the monitoring.

On the contrary, as a determination result in operation S2, when the monitoring standby position determination command is not included in the monitoring command, the cleaner controller 100 may recognize the monitoring standby position stored in the cleaner memory 150. In other words, when the monitoring standby position is already determined and stored in the cleaner memory 150, the monitoring command may not include the monitoring position determination command. In this case, since the determined monitoring standby position is stored in the cleaner memory 150, the cleaner controller 100 may recognize the monitoring standby position stored in the cleaner memory 150.

Then the robot cleaner 10 determines whether a current time reaches a monitoring start time (operation S7). As a determination result in operation S7, when the current time reaches the monitoring start time, the robot cleaner 110 moves to the set monitoring standby position P (operation S8). In the present embodiment, operation S8 may be an operation of determining whether a movement condition to the monitoring standby position P is satisfied.

Herein, when the robot cleaner 10 receives the monitoring command, the monitoring standby position is determined in advance, and the monitoring start time is a current time, the robot cleaner 10 may instantly move to the monitoring standby position P when receiving the monitoring command. In other words, in this case, operation S2 to S7 may be omitted.

In addition, when the robot cleaner 10 receives the monitoring command, the monitoring standby position is determined in advance, but the current time does not reach the monitoring start time, the robot cleaner 10 may stand by at the initial position. As described above, the initial position may be a position where the robot cleaner 10 docks to the charge device 30. In addition, when the current time reaches the monitoring start time, the robot cleaner 10 may move to the monitoring standby position P. In other words, in this case, operation S2 to S6 may be omitted.

In addition, in a state where the robot cleaner 10 moves to the monitoring standby position P, the image acquisition unit 110 may be activated (operation S9).

At this point, referring to FIG. 5A, when there is not an obstacle O at the monitoring standby position P, the robot cleaner 10 may accurately move to the monitoring standby position P (see arrow M3).

On the contrary, referring to FIG. 5B, when there is an obstacle O at the monitoring standby position P, the robot cleaner 10 may avoid the obstacle O to move to a position adjacent to the monitoring standby position P, namely, a changed monitoring standby position P1.

However, since knowing a current position and map information, the robot cleaner 20 may recognize a predetermined distance between the monitoring standby position P and the changed monitoring standby position P1. However, when the distance between the monitoring standby position P and the changed monitoring standby position P1 exceeds the predetermined distance, door or window monitoring by the robot cleaner 20 may be not performed well. Accordingly, when the distance between the monitoring standby position P and the changed monitoring standby position P1 exceeds the predetermined distance, the robot cleaner 20 may transmit a message for a resetting request for the monitoring standby position. The robot cleaner 10 may transmit an image acquired by the image acquisition unit 110 together with the resetting request message for the monitoring standby position.

The user interface 220 of the remote terminal 20 may display images together with the message transmitted by the robot cleaner 10. The user may check the image displayed on the user interface 220 to change or determine a current changed monitoring standby position P1 of the robot cleaner 10.

When the image acquisition unit 100 is activated in operation S9, the mage acquisition unit 110 intermittently acquires images and the acquired images are stored in the cleaner memory 150.

The cleaner controller 100 compares the images stored in the cleaner memory 150 to determine whether an event occurs (operation S10). As described above, two images are compared to determine whether there is a difference between the two images, and when there is a difference, it is determined that an event has occurred. The two image compared herein are referred as a current image and a previous image.

In detail, when there is a difference between the two images, various cases may be included such as a case where an object including a person does not exist in the previous image but exists in the current image, a case where an object exists in the previous image but does not exist in the current image, a case where an object exists in the two images but their positions are changed, a case where an object exists in the two images but an additional object exists in the current image, or an opposite case thereto, a case where a size of an object gets larger or smaller, or a case where parts of the two images are changed in brightness or the entire brightness of the two images are changed.

Such comparison between the two images may be, as described above, performed for each pixel after each image is divided into a plurality of pixels.

As a determination result in operation S10, when an event is determined to have occurred, the robot cleaner 10 may transmit a plurality of images to the remote terminal 20 (operation S11).

In this case, an event is not determined to have occurred by the image comparison, but an event is determined to have occurred based on a voice acquired by the voice acquisition unit 120 and in this case, images acquired by the image acquisition unit 110 may also be transmitted to the remote terminal 20. Then, robot cleaner 10 may determine whether an elapsed time reaches a set time after image transmission (operation S12).

The reason why the robot cleaner 10 determines whether the elapsed time reaches the set time after the image transmission is to give a time to release a monitoring mode to a house owner or family member, when an event occurrence is caused by entry of the house owner of family member to a house. In other words, after the event occurs and images are transmitted and before a set time is not reached, the cleaner controller 100 does not determine again whether the event reoccurs.

In addition, the house owner or family member may release the monitoring mode during the set time. When the images are transmitted due to the event occurrence and the cleaner controller determines again whether an event occurs, since images are continuously transmitted to the remote terminal 20, the user may feel burdened. However, the length of the set time may be shorter than the monitoring period, but is not limited and may be set to one minute. In addition, the set time may be changed.

As a determination result in operation S12, when it is determined that the elapsed time after the image transmission reaches the set time, the cleaner controller 100 determines whether a current time reaches a monitoring termination time (operation S13).

As a determination result in operation S13, when the current time does not reach the monitoring termination time, the method returns to operation S9. In other words, the robot cleaner 10 acquires images while standing by at the monitoring standby position P or the changed monitoring standby position P1.

On the contrary, as a determination result in operation S13, when the current time reaches the monitoring termination time, the robot cleaner 10 transmits a monitoring termination notification message to the remote terminal 20 (operation S14).

In addition, the robot cleaner 10 returns to the charging device 30 (operation S15). The cleaner controller 100 may check the battery charge during the monitoring time, and when the battery charge is a reference amount or smaller, may terminate the monitoring and return to the charging device. In addition, the robot cleaner 10 may transmit the monitoring termination notification message to the remote terminal 20

In the present embodiment, since an event occurrence may be detected based on images acquired by the image acquisition unit, an additional detecting unit may not be necessary. In addition, the images acquired by the image acquisition unit may be transmitted to the remote terminal, the user may easily check the images capturing the inside of the house or building. In addition, since a user may set the monitoring standby position, the image acquisition unit may acquire an image including an external intruder.

FIGS. 6A to 6C are views showing monitoring standby position determination screens displayed on the user interface of the remote terminal according to an embodiment.

Referring to FIG. 6A, the user interface 220 may display the monitoring standby position determination screen 241. The monitoring standby position determination screen 241 may be displayed on the user interface 220 for determining an initial monitoring standby position or changing the monitoring the standby position. The monitoring standby position determination screen 241 may include a first region 242 on which an image is displayed, a second region 243 for determining a position of the robot cleaner, and a third region 244 for inputting a command.

An icon 253 of the charging device and an icon of the robot cleaner 254 may be displayed on the second region 242. The user may select a specific point, e.g., the monitoring standby position, in the second region 242, and may transmit the selected point and relative coordinate information of the icon 253 of the charging device to the robot cleaner 10.

The robot cleaner 10 moves to the monitoring standby position corresponding to a specific point after separated from the charging device 30 on the basis of the transmitted relative coordinate information.

At this point, as shown in FIG. 6B, the icon 254 of the robot cleaner on the second region 242 moves to the selected specific point.

An image transmitted from the robot cleaner 10 may be displayed on the first region 242. In other words, the robot cleaner 10 may transmit to the remoter terminal 20 the images acquired by the image acquisition unit 110 in a state of movement to the monitoring standby position, and the images transmitted from the robot cleaner 10 may be displayed on the first region 242.

A storage selection unit 255 for determining (i.e., storing) the monitoring standby position and a cancel selection unit 256 for canceling the monitoring standby position determination may be displayed on the third region 244. The user may select the storage selection unit 255 or the cancel selection unit 256 after checking the images displayed on the first region 242.

Rotation command input units 251 and 252 for inputting rotation commands of the robot cleaner 10 may be displayed on the first region 242. The rotation command input units 251 and 252 may include the first rotation command input unit 251 and the second rotation command input unit 252. In addition, a rotation angle of the robot cleaner 10 may be determined according to the number of presses or a press time of each of the rotation command input units 251 and 252. As an example, when the first rotation command input unit 251 is selected, the robot cleaner 10 may rotate clockwise, and the second rotation command input unit 252 is selected, the robot cleaner 10 may rotate counterclockwise.

As an example, as shown in FIG. 6C, when the first rotation command input unit 251 is selected, the robot cleaner 10 may rotate clockwise by a predetermined angle, and the icon 254 of the robot cleaner on the second region 243 may also be rotated clockwise by the predetermined angle. In addition, since the images acquired by the image acquisition unit 110 is changeable by the clockwise rotation of the robot cleaner 10, a changed image may be displayed on the first region 242.

According to the present embodiment, since the user at a remote position other than a house may also determine the monitoring standby position of the robot cleaner on the basis of the images transmitted from the robot cleaner, a security effective monitoring standby position may be determined.

Although it is described that the monitoring standby position is determined by a remote terminal in FIGS. 6A to 6C, it is also possible to identically set the monitoring standby position at the user interface of the robot cleaner.

Figure 7:
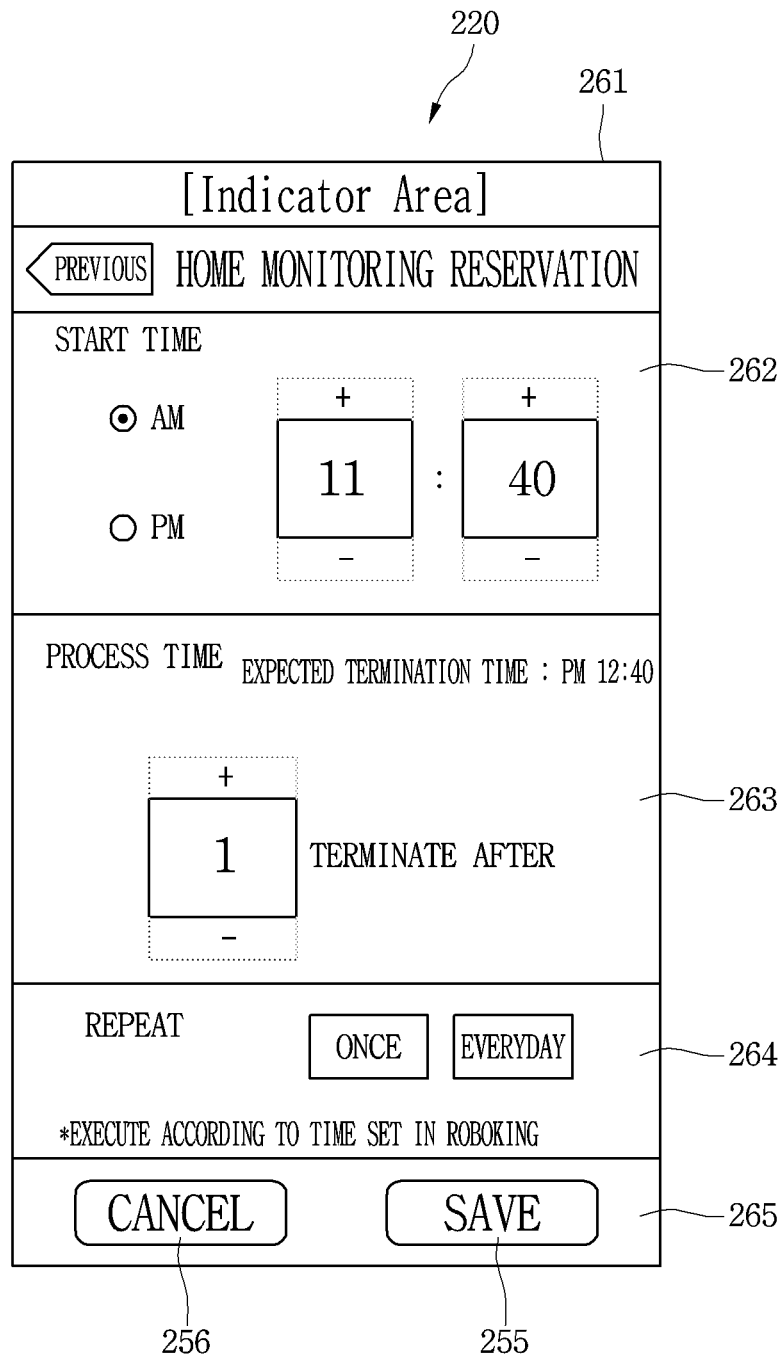
FIG. 7 is a view illustrating a monitoring time setting screen displayed on a user interface of a remote terminal according to an embodiment.

FIG. 7 is a view illustrating a monitoring time setting screen displayed on the user interface of the remote terminal according to an embodiment. Referring to FIG. 7, the monitoring time setting screen 261 may be displayed on the user interface 220. A monitoring schedule may be set on the monitoring time setting screen 261. As an example, the monitoring time setting screen 261 may include a first region 262 for setting a monitoring start time and a second region 263 for setting the monitoring period. The monitoring time setting screen 261 may further include a third region 264 for setting monitoring repetition or not. The monitoring time setting screen 261 may further include a fourth region 265 for storing or canceling the set monitoring schedule. A storage selection unit 255 for storing a set time and a cancel selection unit 256 for canceling the set time may be displayed on the fourth region 265. A selection unit for selecting morning or afternoon and a selection unit for selecting a time may be displayed on the first region 262. When a monitoring start time is selected, the monitoring start time may be a current time or a future time.

A selection unit for setting the monitoring period may be displayed on the second region 263.

A selection unit for selecting whether monitoring is performed once or everyday may be displayed on the third region 264.

When the user selects the storage selection unit 255 after completing setting of the monitoring schedule, the set monitoring schedule information is transmitted to the robot cleaner 10.

When the monitoring start time is a current time, the robot cleaner 10 instantly performs a monitoring mode. On the contrary, when the monitoring start time is after the current time, the robot cleaner 10 maintains a standby state and then performs the monitoring mode when the current time reaches the monitoring start time.

Although it is described that the monitoring time is set by a remote terminal in FIG. 7, it is also possible to identically set the monitoring time at the user interface of the robot cleaner.

Figure 8:
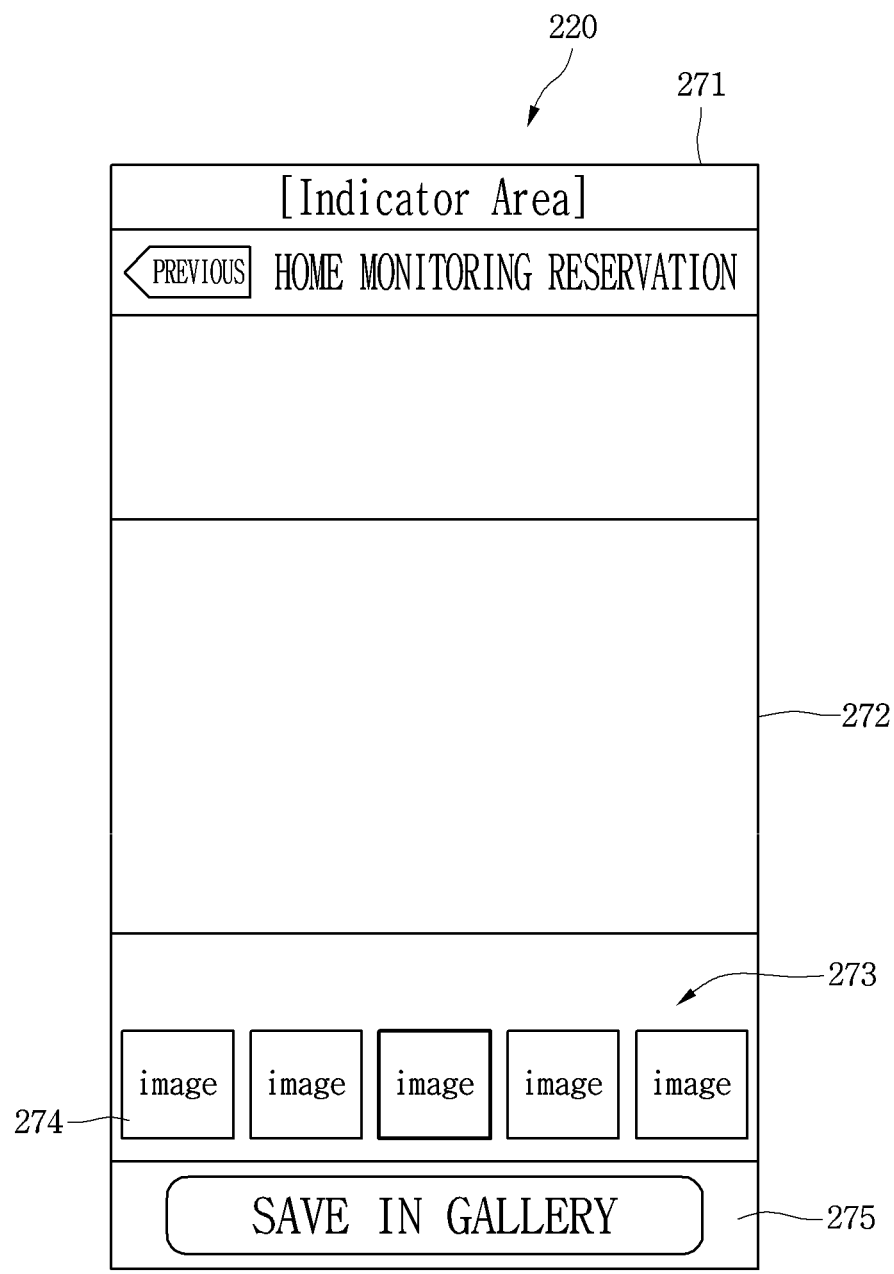
FIG. 8 is a view illustrating an image check screen displayed on a user interface of a remote terminal according to an embodiment.

FIG. 8 is a view illustrating a monitoring confirmation screen displayed on the user interface of the remote terminal according to an embodiment. Referring to FIG. 8, when an event occurs during operation of the robot cleaner in the monitoring mode, then the image acquired by the robot cleaner is transmitted to the remote terminal and the remote terminal may display an image confirmation screen 271 on the user interface 220.

The remote terminal 20 may simultaneously or sequentially receive a plurality of images from the robot cleaner 10, and an enlarged image 272 of any one of the plurality of images may be displayed on the image display screen 272 together with a list 273 of the plurality of images 274. As an example, the remote terminal 20 receives 5 images and the received 5 images may be displayed on the image display screen 272, but the number of the displayed images is not limited.

The storage selection unit 275 for inputting a command for storing the images in the terminal memory 230 may be further displayed on the image display screen 272.

According to an embodiment, since the received images from the robot cleaner may be checked by the remote terminal at the time of event occurrence, a user may rapidly and accurately check a situation inside the house or building.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for controlling a robot cleaner comprising:
recognizing information on a monitoring standby position, by the robot cleaner, wherein the monitoring standby position is a position at an end of a moving path where the robot cleaner is to standby for monitoring;
moving along the moving path to the monitoring standby position at a monitoring start time, by the robot cleaner;
acquiring an image at the monitoring standby position, by an image acquisition unit of the robot cleaner;
determining whether an event has occurred, by the robot cleaner, based on the image acquired by the image acquisition unit; and
transmitting the image acquired by the image acquisition unit to an external remote terminal when it is determined that the event occurred,
wherein the moving to the monitoring standby position comprises:
determining whether there is an obstacle at the monitoring standby position;
determining a changed monitoring standby position at which the obstacle is avoided, if there is the obstacle at the monitoring standby position,
determining whether a distance between the monitoring standby position and the changed monitoring standby position is equal to or less than a predetermined distance;
moving to the changed monitoring standby position if the distance between the monitoring standby position and the changed monitoring standby position is equal to or less than a predetermined distance and stopping at the changed monitoring standby position; and
transmitting a message for a resetting request for the monitoring standby position to an outside if the distance between the monitoring standby position and the changed monitoring standby position exceeds the predetermined distance.

2. The method according to claim 1, wherein when the monitoring start time is a current time, the robot cleaner recognizes the information on the monitoring standby position and then moves to the monitoring standby position.

3. The method according to claim 1, wherein when the monitoring start time is after a current time, the robot cleaner stands by an initial position and when the current time reaches the monitoring start time, the robot cleaner moves to the monitoring standby position.

4. The method according to claim 3, wherein the initial position is a position at which the robot cleaner is docked at a charging device.

5. The method according to claim 1, further comprising:
receiving a monitoring position determination command from the remote terminal;
moving to the monitoring standby position received from the external remote terminal;
activating the image acquisition unit;
transmitting the image acquired by the image acquisition unit to the external remote terminal; and
receiving a position determination command from the external remote terminal.

6. The method according to claim 5, further comprising:
returning to the charging device after receiving the position determination command from the external remote terminal.

7. The method according to claim 1, wherein in the recognizing of information on a monitoring standby position, the robot cleaner retrieves a monitoring standby position stored in a cleaner memory.

8. The method according to claim 1, wherein the determining of whether an event has occurred comprises:
   comparing, by the robot cleaner, a plurality of images to determine whether there is a difference between images; and
   determining that the event occurred when there is the difference between the images.

9. The method according to claim 8, wherein in the determining of whether an event has occurred, the robot cleaner divides the images into a plurality of pixels and determines whether there is a difference in the pixels.

10. The method according to claim 1, wherein the transmitting of the image acquired by the image acquisition unit comprises transmitting to the external remote terminal an image acquired after the event occurred.

11. The method according to claim 1, wherein the transmitting of the image acquired by the image acquisition unit comprises transmitting to the external remote terminal an image used for determining whether the event has occurred.

12. The method according to claim 1, further comprising:
   determining whether a current time reaches a monitoring termination time, by the robot cleaner; and
   deactivating the image acquisition unit when the current time reaches the monitoring termination time.

13. The method according to claim 12, further comprising returning to a charging device, by the robot cleaner, when the current time reaches the monitoring termination time.

14. The method according to claim 12, further comprising:
   determining an amount of a battery charge before the current time reaches the monitoring termination time, by the robot cleaner; and
   returning to the charging device for charging the battery, by the robot cleaner, before the current time reaches the monitoring termination time when the remaining amount is a reference amount or smaller.

15. The method according to claim 14, further comprising transmitting a monitoring termination notification message to the external remote terminal, by the robot cleaner, when the amount of the battery charge is the reference amount or smaller.

16. The method according to claim 1, wherein the determining of whether an event has occurred comprises:
   acquiring a voice from a voice acquisition unit in the robot cleaner; and
   determining whether the event occurred based on the voice acquired by the voice acquisition unit.

* * * * *